United States Patent
Bender et al.

(10) Patent No.: US 6,919,099 B2
(45) Date of Patent: Jul. 19, 2005

(54) METHOD FOR TREATING AN ANIMAL CARCASS TO REDUCE BACTERIAL CONTAMINATION

(75) Inventors: Fredric G. Bender, Mc Murray, PA (US); Robert S. Pirolo, Tacoma, WA (US)

(73) Assignee: Danisco A/S, Copenhagen (DK)

( * ) Notice: Subject to any disclaimer, the term of this patent is extended or adjusted under 35 U.S.C. 154(b) by 268 days.

(21) Appl. No.: 10/189,306

(22) Filed: Jul. 3, 2002

(65) Prior Publication Data

US 2003/0194475 A1 Oct. 16, 2003

Related U.S. Application Data

(60) Provisional application No. 60/302,761, filed on Jul. 3, 2001.

(51) Int. Cl.[7] .......................... A23B 4/027; A23B 7/157
(52) U.S. Cl. ...................... 426/331; 426/332; 426/333; 426/335; 426/532
(58) Field of Search ................................ 426/331, 332, 426/333, 335, 532

(56) References Cited

U.S. PATENT DOCUMENTS

| | | | |
|---|---|---|---|
| 4,592,892 A | 6/1986 | Ueno et al. | 422/28 |
| 5,283,073 A | 2/1994 | Bender et al. | 426/332 |
| 5,512,309 A | 4/1996 | Bender et al. | 426/332 |
| 5,891,499 A | 4/1999 | Balsano | 426/335 |

OTHER PUBLICATIONS

International Search Report for the PCT Application for this Case; Namely, PCT/US02/21234.

*Primary Examiner*—Arthur L. Corbin
(74) *Attorney, Agent, or Firm*—Fay, Sharpe, Fagan, Minnich & McKee, LLP

(57) ABSTRACT

Contacting an animal carcass with an aqueous solution containing an effective amount of an alkali silicate reduces bacterial contamination of the carcass or retards bacterial growth on the carcass or both reduces bacterial contamination and retards bacterial growth on the carcass, without substantial detriment to the organoleptic properties of the carcass. The method is also useful in treating edible plant materials, such as fruits and vegetables, to reduce bacterial contamination, retard bacterial growth or reduce bacterial contamination and retard bacterial growth on the plant materials.

30 Claims, No Drawings

METHOD FOR TREATING AN ANIMAL CARCASS TO REDUCE BACTERIAL CONTAMINATION

This application claims benefit of Ser. No. 60/302,761 filed Jul. 3, 2001.

FIELD OF THE INVENTION

This invention relates to an improved method for treating animal carcasses to reduce bacterial contamination of the carcass or retard bacterial growth on the carcass.

BACKGROUND OF THE INVENTION

Animals, such as, for example, poultry, red meat animals of all kinds, fish and crustaceans are killed and their carcasses are processed to produce food products for human consumption. Typically, the processing of such animals includes evisceration, which may contaminate the edible portion of the animal with unwanted bacteria, which may multiply depending upon the sanitary conditions employed in further processing steps. Bacterial contamination of the edible portions of the animal may cause spoilage of the edible portions and illness of consumers of the contaminated edible portions.

Treatment processes which involve contacting animal carcasses with aqueous solutions containing alkali metal phosphates and which are effective in reducing bacterial contamination and/or retarding bacterial growth without substantial detriment to the organoleptic properties of the carcasses are known, see, e.g., U.S. Pat. No. 5,283,073. However, these processes tend to introduce relatively high amounts of phosphate compounds into treatment waste streams, which may be undesirable from an environmental perspective.

What is needed in the art is a method for treating animal carcasses which is effective in reducing bacterial contamination and/or retarding bacterial growth without substantial detriment to the organoleptic properties of the carcasses and which does not produce a waste stream containing a high amount of phosphate compounds.

SUMMARY OF THE INVENTION

In a first aspect, the present invention is directed to a method for treating animal carcass to reduce bacterial contamination of the carcass or retard bacterial growth on the carcass, comprising contacting the animal carcass with an aqueous solution comprising an effective amount of an alkali silicate.

In a second aspect, the present invention is directed to a method for treating animal carcass to reduce bacterial contamination of the carcass or retard bacterial growth on the carcass, comprising contacting the animal carcass with a substantially ethanol free aqueous solution comprising effective amounts of two or more of an alkali silicate, an alkali carbonate and an alkali hydroxide.

The treatment method of the present invention allows simple and economical washing of animal carcasses to reduce bacterial contamination of the carcass and/or retard bacterial growth on the carcass, without substantial detriment to the organoleptic properties of the carcass and without generating a waste stream that contains a high amount of phosphates.

In a third aspect, the present invention is directed to a method for treating edible plant materials to reduce bacterial contamination of the edible plant materials or retard bacterial growth on the edible plant materials, comprising contacting an edible plant material selected from fruits and vegetables with an aqueous solution comprising effective amount of an alkali silicate.

The treatment method of the present invention allows simple and economical washing of fruits and vegetables to reduce bacterial contamination of the fruits and vegetables or retard bacterial growth on the fruits and vegetables, without substantial detriment to the organoleptic properties of the fruits and vegetables and without generating a waste stream that contains a high amount of phosphates. Such treatment may extend the shelf life of the treated fruits and vegetables by providing improved control of microrganisms involved in spoilage of the fruits and vegetables.

DETAILED DESCRIPTION OF INVENTION AND PREFERRED EMBODIMENTS

In a preferred embodiment, the treatment solution of the present invention is effective as a bacteriocide under the treatment conditions and killing bacteria is one mechanism by which the treatment of the present invention reduces bacterial contamination on the carcass.

As used herein, the terminology "reduce bacterial contamination or retard bacterial growth" refers generally to reducing bacterial contamination or retarding bacterial growth, as well as reducing bacterial contamination and retarding bacterial growth.

As used herein, the terminology "animal carcass" refers generally to the edible portion of any dead animal, including birds, fish, crustaceans, shellfish and mammals. Birds include for example, chickens, turkeys, geese, capon, game hens, pigeon, ducks, guinea fowl, pheasants, quail and partridges. Fish include, for example, catfish, trout, salmon, flounder, tuna, swordfish, and shark. Crustaceans include, for example, crayfish, shrimp, prawns, crabs and lobsters. Shellfish include clams, scallops, oysters and mussels. Mammals include cattle, pigs, sheep, lambs and goats.

In a preferred embodiment, the animal carcass is eviscerated, that is, the internal organs of the animal are removed from the carcass, prior to treatment with the aqueous treatment solution according to the method of the present invention. An eviscerated carcass typically comprises bones, skeletal muscle and associated fascia. In a preferred embodiment, the skin is not removed from the eviscerated carcass of a fish or a bird prior to treatment with the aqueous treatment solution according to the method of the present invention. In a preferred embodiment, the skin is removed from the eviscerated carcass of a mammal prior to treatment with the aqueous treatment solution according to the method of the present invention.

As used herein the terminology "edible plant materials" means plant materials selected from fruits and vegetables that are typically used as foods for humans. Suitable edible plant materials include, for example, lettuce, tomatoes, cucumbers, carrots, spinach, kale, chard, cabbage, broccoli, cauliflower, squash, beans, peppers, apples, oranges, pears, melons, peaches, grapes, plums and cherries.

A used herein, the term "organoleptic" means the sensory properties, including the appearance, texture, taste and smell, of food products made from the carcass.

The bacterial contamination addressed by the method of the present invention includes pathogenic bacteria, such as, for example, salmonellae, such as *Salmonella typhimurium*, *S. choleraesuis* and *S. enteriditis*, as well as *E. coli*, camphylobacter and spoilage bacteria, such as, for example, *Pseudomonus aeruginosa*.

In a preferred embodiment, the alkali silicate exhibits a solubility of greater than 0.5 percent by weight (wt %) more preferably greater than 3 wt %, in water.

Compounds suitable as the alkali silicate component of the treatment solution of the present invention are crystalline or amorphous alkali silicate compounds according to formula (1):

$$M_2O \cdot m(SiO_2) \cdot nH_2O \qquad (1)$$

wherein:

M is sodium or potassium, m is a number, wherein $0.5 \leq m \leq 3.5$, indicating the number of mole(s) of the $SiO_2$ moiety per 1 mole of $M_2O$ moiety; and n indicates the water content, expressed as wt % water, wherein $0\% \leq n \leq 55\%$.

Suitable alkali silicates include, for example, sodium disilicates, sodium metasilicates, potassium disilicates, and potassium metasilicates, and may be in anhydrous or hydrated form.

In a preferred embodiment, the alkali silicate comprises one or more metasilicates, which are crystalline products, according to $M_2O \cdot (SiO_2) \cdot n'H_2O$, wherein M is Na or K and n' is 0, 5, 6 or 9 and indicates the number of moles of water per $SiO_2$ moiety. In a preferred embodiment, the alkali silicate comprises one or more of anhydrous sodium metasilicate, anhydrous potassium metasilicate, sodium metasilicate pentahydrate, sodium metasilicate hexahydrate and sodium metasilicate nonahydrate. More preferably, the alkali silicate comprises one or more of anhydrous sodium metasilicate, anhydrous potassium metasilicate and sodium metasilicate pentahydrate. Even more preferably, the alkali silicate comprises one or more of anhydrous sodium metasilicate and anhydrous potassium metasilicate, and one or more of sodium metasilicate pentahydrate and potassium metasilicate pentahydrate.

In a preferred embodiment, the aqueous treatment solution comprises greater than or equal to 0.05 percent by weight (wt %) alkali silicate, more preferably from 0.1 wt % to saturation, still more preferably from 1 to 15 wt %, and even more preferably from 5 to 10 wt %, alkali silicate, wherein the ranges are calculated on the basis of the weight of the anhydrous alkali silicate. Either the anhydrous form or a hydrated form of the alkali silicate may be used to form the treatment solution, provided that the appropriate adjustment is made to compensate for the weight of any associated water of hydration. Unless otherwise specified, the concentrations of alkali silicates given herein are based on the weight of anhydrous alkali silicate.

In a highly preferred embodiment, the aqueous treatment solution comprises from 0.1 to 8 wt %, more preferably from 1 to 6 wt % and even more preferably from 2 to 4 wt % alkali silicate.

In a preferred embodiment, the aqueous solution comprises an amount of alkali silicate, typically from greater than 3 wt % to 6 wt %, more preferably from greater than 3 wt % to 5 wt % alkali silicate, effective to reduce bacterial contamination of the animal carcass. In the preferred embodiment, the method of the present invention is suitable as the primary step of a carcass processing line for reducing bacterial combination of the carcass below a target value.

In an alternative embodiment, the aqueous solution comprises an amount of alkali silicate, typically from 0.5 wt % to 4 wt % alkali silicate more preferably from 0.5 to 3 wt % alkali silicate, that is effective to retard bacterial growth on the animal carcass, but that is not necessarily sufficient to kill bacteria or otherwise reduce bacterial contamination of the carcass. In a preferred embodiment, the less concentrated alkali silicate solution is used in combination with other treatments, such as, for example, treating the carcass with aqueous lactic acid solution, washing the carcass with hot water, e.g., at a temperature of from about 160° F. to about 180° F., or cleaning the carcass with steam and vacuum, wherein the series of treatments are, in combination, effective to reduce bacterial contamination of the animal carcass below a target value.

In a preferred embodiment, the aqueous treatment solution consists essentially of a solution of alkali silicate in water. In an alternative preferred embodiment, the aqueous treatment solution consists of a solution of alkali silicate in water. As used herein, the term "water" means tap water, that is, water as available onsite without requiring purification, that may contain minor amounts of components other than $H_2O$.

In a preferred embodiment, the treatment solution further comprises an alkali carbonate or alkali bicarbonate according to formula (2):

$$M'_{2-a}H_aCO_3 \cdot n''H_2O \qquad (2)$$

wherein:

M' is sodium or potassium, a is 0 or 1, and n'' is a number wherein $0 \leq n'' \leq$ fully hydrated.

Suitable alkali carbonates include sodium carbonate, potassium carbonate and may be in anhydrous or hydrated form. Suitable alkali bicarbonates include sodium bicarbonate and potassium bicarbonate. In a preferred embodiment, the treatment solution comprises one or more of sodium carbonate and potassium carbonate.

In a highly preferred embodiment, the treatment solution comprises greater than or equal to 0.05 wt %, more preferably from 0.1 wt % to saturation, more preferably from 0.2 to 15 wt % and still more preferably from 0.4 to 10 wt % alkali carbonate.

In an alternative embodiment, the aqueous treatment solution comprises from 0.2 to 5 wt %, and even more preferably from 0.4 to 1.0 wt %, alkali carbonate.

In a preferred embodiment, the treatment solution further comprises an alkali hydroxide according to formula (3):

$$M''OH \qquad (3)$$

wherein:

M'' is sodium or potassium.

Suitable alkali hydroxides include, for example, sodium hydroxide, potassium hydroxide. Preferably, the hydroxide comprises sodium hydroxide.

In a highly preferred embodiment, the treatment solution comprises greater than or equal to 0.05 wt %, more preferably from 0.5 to 5 wt %, still more preferably from 0.1 to 2 wt %, and even more preferably from 0.2 to 1 wt % of the alkali hydroxide.

In a preferred embodiment, the present invention is directed to a method for treating animal carcass to reduce bacterial contamination of the carcass or retard bacterial growth on the carcass, comprising contacting the animal carcass with an aqueous solution comprising greater than or equal to 0.05 wt % of an alkali silicate and greater than or equal to 0.05 wt % of an alkali carbonate.

In a more highly preferred embodiment, the treatment solution comprises from 0.1 wt % to saturation, more preferably from 0.5 to 10 wt % alkali silicate, and even more preferably from 3 to 8 wt % alkali silicate and 0.1 wt % to saturation, more preferably from 0.2 to 15 wt %, and even more preferably from 0.4 to 10 wt % alkali carbonate.

In a preferred embodiment, the aqueous treatment solution consists essentially of a solution of alkali silicate and alkali carbonate in water. In an alternative preferred embodiment, the aqueous treatment solution consists of a solution of alkali silicate and alkali carbonate in water.

In a preferred embodiment, the present invention is directed to a method for treating animal carcass to reduce bacterial contamination of the carcass or retard bacterial growth on the carcass, comprising contacting the animal carcass with an aqueous solution comprising greater than or equal to 0.05 wt % of an alkali silicate and greater than or equal to 0.05 wt % of an alkali hydroxide.

In a more highly preferred embodiment, the treatment solution comprises from 0.1 wt % to saturation more preferably from 0.5 to 10 wt %, and even more preferably from 3 to 8 wt % alkali silicate and from 0.5 to 5 wt %, more preferably from 0.1 to 2 wt %, and even more preferably from 0.2 to 1 wt % of the alkali hydroxide.

In a preferred embodiment, the aqueous treatment solution consists essentially of a solution of alkali silicate and alkali hydroxide in water. In an alternative preferred embodiment, the aqueous treatment solution consists of a solution of alkali silicate and alkali hydroxide in water.

In a preferred embodiment, the present invention is directed to a method for treating animal carcass to reduce bacterial contamination of the carcass or retard bacterial growth on the carcass, comprising contacting the animal carcass with an aqueous solution comprising greater than or equal to 0.05 wt % of an alkali carbonate and greater than or equal to 0.05 wt % of an alkali hydroxide.

In a more highly preferred embodiment, the treatment solution comprises from 0.1 wt % to saturation, more preferably from 0.2 to 15 wt %, and even more preferably from 0.4 to 10 wt %, alkali carbonate and 0.5 to 5 wt %, more preferably from 0.1 to 2 wt %, and even more preferably from 0.2 to 1 wt % alkali hydroxide.

In a preferred embodiment, the aqueous treatment solution consists essentially of a solution of alkali carbonate and alkali hydroxide in water. In an alternative preferred embodiment, the aqueous treatment solution consists of a solution of alkali carbonate and alkali hydroxide in water.

In a preferred embodiment, the present invention is directed to a method for treating animal carcass to reduce bacterial contamination of the carcass or retard bacterial growth on the carcass, comprising contacting the animal carcass with an aqueous solution comprising greater than or equal to 0.05 wt % of an alkali silicate, greater than 0.05 wt % of an alkali carbonate and greater than or equal to 0.05 wt % of an alkali hydroxide.

In a more highly preferred embodiment, the treatment solution comprises from 0.1 wt % to saturation, more preferably from 0.5 to 10 wt % alkali silicate, and even more preferably from 3 to 8 wt % alkali silicate, from 0.1 wt % to saturation, more preferably from 0.2 to 15 wt %, and even more preferably from 0.4 to 10 wt %, alkali carbonate and 0.5 to 5 wt %, more preferably from 0.1 to 2 wt %, and even more preferably from 0.2 to 1 wt % alkali hydroxide.

In a preferred embodiment, the aqueous treatment solution consists essentially of a solution of alkali silicate, alkali carbonate and alkali hydroxide in water. In an alternative preferred embodiment, the aqueous treatment solution consists of a solution of alkali silicate, alkali carbonate and alkali hydroxide in water.

The treatment solution may, optionally, further comprise other components, such as for example, alkali metal salts, such as for example, NaCl, KCl, and surfactants suitable for food use.

In a preferred embodiment, the treatment solution of the present invention comprises less than 0.5 wt %, more preferably less than 0.2 wt %, ethanol. Even more preferably the treatment solution is substantially free, more preferably free, of ethanol.

In one embodiment, the aqueous solution may further comprise less than 10 wt % alkali phosphate, preferably less than 5 wt % alkali phosphate and more preferably less than 2 wt % alkali phosphate, in order to provide an aqueous treatment solution with a reduced phosphate content compared to know alkali phosphate antimicrobial treatments.

In a preferred embodiment, the treatment solution of the present invention does not add any substantial amount of phosphates to the carcass processing waste stream and comprises, prior to use, less than 0.2 wt %, more preferably less than 0.1 wt %, trialkali phosphate. Even more preferably, the treatment solution is, prior to use, substantially free, more preferably free, of trialkali phosphate. Phosphates of animal origin may be present in used or recycled treatment solution and in carcass processing waste streams.

In a preferred embodiment, the treatment solution exhibits a pH of from about 11.5 to about 14, more preferably from about 12 to about 13.75, even more preferably from about 12.25 to about 13.5 and still more preferably from about 12.75 to about 13.25.

The treatment solution is made by dissolving the components of the solution in water.

In a preferred embodiment, the animal carcass is contacted with the treatment solution after slaughter, either prior to, during or after chilling, by dipping the carcass in the treatment solution or by spraying the treatment solution on the carcass. In a preferred embodiment, the animal carcass is contacted with the treatment solution by spraying the treatment solution under a gage pressure of greater than 2 pounds per square inch above atmospheric pressure (psig), more preferably from 2 to 400 psig, onto all accessible surfaces of the carcass. In a preferred embodiment, bird carcasses are contacted with the aqueous treatment solution by spraying the treatment solution onto the carcass at a pressure of from 3 to 40 psig. In a preferred embodiment, mammalian carcasses are contacted with the aqueous treatment solution by spraying the solution onto the carcass at a pressure of from 20 to 150 psig.

In a preferred embodiment, the treatment solution is at a temperature of from about 0 to about 85° C., more preferably from 0 to about 70° C., still more preferably from about 10° C. to about 50° C. and even more preferably from about 20° C. to about 40° C.

In a preferred embodiment, the animal carcass is contacted with the treatment solution for greater than or equal to about 1 second to about 5 minutes, more preferably from about 5 seconds to about 2 minutes, and even more preferably from about 15 seconds to about 1 minute. The preferred contact times refer to the duration of the active application process, for example, dipping or spraying, used to contact the aqueous treatment solution with the carcass. Once applied, the treatment solution can be immediately rinsed off of the carcass or, alternatively, allowed to remain on the carcass.

Animal carcasses that have been treated according to the present invention can, immediately after such treatment, be processed according to normal carcass process conditions, such as draining or chilling. Optionally, the treatment solution residue may be rinsed from the carcass prior to further processing.

In a preferred embodiment, the treatment solution is recovered and recycled. Preferably, the recovered treatment solution is filtered to remove solids prior to recycling. Preferably, the respective amounts of the one or more components of the treatment solution are monitored and the composition of the treatment solution is controlled by adding water and/or additional amounts of the metasilicate, carbonate and/or hydroxide components to the solution.

EXAMPLE 1

Aqueous treatment solutions were made at 0.10, 0.20, 0.25, 0.30, 0.40, 0.50, 1.00, 2.50, 5.00, 10.0 and 20.0% w/w of sodium hydroxide (NaOH), potassium hydroxide (KOH), AvGard™ TSP dodecahydrate (AVGARD), sodium carbonate ($Na_2CO_3$), sodium metasilicate nonahydrate, sodium chloride (NaCl) or potassium chloride (KCl). The weight percentages for the sodium metasilicate nonahydrate were calculated based on the total weight of sodium metasilicate nonahydrate, i.e., including the water of hydration. An equal mixture of *E.coli* ATCC 25922, *E.coli* ATCC 8739 and *E.coli* O 157:H7 ATCC 43895 was prepared. The bacteria mixture was contacted with each of the respective treatment solutions by, in each case, adding a 1 ml sample of the bacteria mixture to a 99 ml sample of the respective treatment solution. In each case, the bacteria mixture was contacted with the respective treatment solution for 15 seconds. Following the 15 seconds contact time, samples of the treatment solution were subjected to a standard aerobic plate count. The baseline bacterial level when 1 ml of the bacteria mixture was added to 99 ml of sterile water was 850,000 colony forming units per ml (cfu/ml). Results following contact with the treatment solutions are reported in TABLES 1 A and 1 B below, in (cfu/ml).

TABLE 1A

Colony Forming Units per Milliliter (cfu/ml)

| | Treatment Solution Concentration (%) | | | | | |
|---|---|---|---|---|---|---|
| | 0.10 | 0.20 | 0.25 | 0.30 | 0.40 | 0.50 |
| NaOH | 140,000 | 60 | — | <10 | <10 | <10 |
| KOH | 640,000 | 22,000 | — | 300 | <10 | <10 |
| Avgard | 690,000 | 600,000 | — | 550,000 | 280,000 | 110,000 |
| $Na_2CO_3$ | — | — | — | — | — | 540,000 |
| Na Meta Silicate | — | — | 700,000 | — | — | 100,000 |
| NaCl | — | — | 720,000 | — | — | — |
| KCl | — | — | 800,000 | — | — | — |

TABLE 1B

Colony Forming Units per Milliliter (cfu/ml)

| | Treatment Solution Concentration (%) | | | | | |
|---|---|---|---|---|---|---|
| | 1.00 | 2.50 | 5.00 | 10.00 | 15.00 | 20.00 |
| NaOH | <10 | — | — | — | — | — |
| KOH | <10 | — | — | — | — | — |
| Avgard | 150 | — | — | — | — | — |
| $Na_2CO_3$ | 100,000 | 33,000 | 51,000 | 36,000 | — | 20,000 |
| Na Meta Silicate | 20 | 10 | <10 | <10 | — | <10 |
| NaCl | 680,000 | — | 810,000 | 770,000 | 770,000 | 780,000 |
| KCl | 930,000 | — | 880,000 | 690,000 | 800,000 | 1,000,000 |

EXAMPLE 2

The procedure of Example 1 was repeated using a mixture of *Salmonella typhimurium* ATCC 14028, *S. choleraesuis* ATCC 4931, and *S. enteriditis* ATCC 13076 in place of the *E.coli* mixture of Example 1. The baseline bacterial level when 1 ml of the *Salmonella* bacteria mixture was added to 99 ml of sterile water was at 630,000cfu/ml. Results are reported in TABLES 2A and 2B below, in cfu/ml.

TABLE 2A

Colony Forming Units per Milliliter (cfu/ml)

| | Treatment Solution Concentration (%) | | | | | |
|---|---|---|---|---|---|---|
| | 0.10 | 0.20 | 0.25 | 0.30 | 0.40 | 0.50 |
| NaOH | 220,000 | 20 | — | 10 | <10 | <10 |
| KOH | 550,000 | 46,000 | — | 40 | <10 | <10 |
| Avgard | 720,000 | 540,000 | — | 420,000 | 74,000 | 4,800 |
| $Na_2CO_3$ | — | — | — | — | — | 350,000 |
| Na Meta Silicate | — | — | 640,000 | — | — | 97,000 |
| NaCl | — | — | 640,000 | — | — | — |
| KCl | — | — | 740,000 | — | — | — |

TABLE 2B

Colony Forming Units per Milliliter (cfu/ml)

| | Treatment Solution Concentration (%) | | | | | |
|---|---|---|---|---|---|---|
| | 1.00 | 2.50 | 5.00 | 10.00 | 15.00 | 20.00 |
| NaOH | <10 | — | — | — | — | — |
| KOH | <10 | — | — | — | — | — |
| Avgard | 200 | — | — | — | — | — |
| $Na_2CO_3$ | 32,000 | 4,200 | 4,500 | 4,900 | — | 4,300 |
| Na Meta Silicate | <10 | <10 | <10 | <10 | — | <10 |
| NaCl | 700,000 | — | 640,000 | 570,000 | 690,000 | 500,000 |
| KCl | 610,000 | — | 600,000 | 590,000 | 700,000 | 630,000 |

EXAMPLE 3

Samples of an equal mixture of *Salmonella typhimurium* ATCC 14028, *S. choleraesuis* ATCC 4931, and *S. enteriditis* ATCC 13076 were contacted with each of the respective treatment solutions set forth in TABLES 3A to 3M by, in each case, adding a 1 ml sample of the bacteria mixture to a 99 ml sample of the respective treatment solution. The aqueous treatment solutions were made by dissolving the following components:

sodium metasilicate nonahydrate and NaOH (TABLES 3A and 3B),
sodium metasilicate nonahydrate and KOH (TABLE 3C),
sodium metasilicate nonahydrate and sodium carbonate (TABLES 3D, 3E and 3F),
sodium metasilicate nonahydrate and NaCl, KCl or AVGARD (TABLE 3G),
NaOH and sodium carbonate (TABLES 3H and 3I),
sodium carbonate and KOH (TABLE 3J),
sodium carbonate and KCl or NaCl (TABLE 3K),
NaOH and KCl (TABLE 3L), and
AVGARD and KCL (TABLE 3 M), in the amounts set forth in the respective TABLES, in water. The weight percentages for the sodium metasilicate nonahydrate were calculated based on the total weight of sodium metasilicate nonahydrate, i.e., including the water of hydration. In each case, the bacteria mixture was contacted with the respective treatment solution for 15 seconds and then subjected to a standard aerobic plate count Results are given below TABLES 3A to 3M in cfu/ml. The baseline bacteria level for each test was determined by contacting 1 ml of the bacteria mixture to 99 ml of sterile water and is given in the 0.0%/0.0% data cell of each of the TABLES 3A to 3M.

TABLE 3A

| Na Metasilicate | NaOH (%) | | | | |
|---|---|---|---|---|---|
| (%) | 0.00 | 0.05 | 0.10 | 0.15 | 0.20 |
| 0.00 | 230,000 | 160,000 | 110,000 | 22,000 | 390 |
| 0.20 | 150,000 | 200,000 | 1,600 | 640 | <10 |
| 0.40 | 100,000 | 21,000 | 1,200 | <10 | <10 |
| 0.60 | 19,000 | 2,400 | 10 | <10 | <10 |
| 0.80 | 420 | <10 | <10 | <10 | <10 |
| 1.00 | 40 | <10 | <10 | <10 | <10 |

TABLE 3B

| Na Metasilicate | NaOH (%) | | | | |
|---|---|---|---|---|---|
| (%) | 0 | 0.05 | 0.1 | 0.15 | 0.2 |
| 0 | 900,000 | 820,000 | 370,000 | 20,000 | <10 |
| 0.2 | 790,000 | 550,000 | 29,000 | <10 | <10 |

TABLE 3B-continued

| Na Metasilicate | NaOH (%) | | | | |
|---|---|---|---|---|---|
| (%) | 0 | 0.05 | 0.1 | 0.15 | 0.2 |
| 0.4 | 560,000 | 18,000 | <10 | <10 | <10 |
| 0.6 | 320,000 | 30 | <10 | <10 | <10 |
| 0.8 | 6,300 | <10 | <10 | <10 | <10 |
| 1 | <10 | <10 | <10 | <10 | <10 |

TABLE 3C

| Na Metasilicate | KOH (%) | | | |
|---|---|---|---|---|
| (%) | 0.00 | 0.10 | 0.20 | 0.30 |
| 0.00 | 110,000 | 130,000 | 18,000 | 200 |
| 0.20 | 130,000 | 120,000 | 800 | <10 |
| 0.40 | 110,000 | 180,000 | <10 | <10 |
| 0.60 | 90,000 | 250 | <10 | <10 |
| 0.80 | 3,500 | <10 | <10 | <10 |
| 1.00 | <10 | <10 | <10 | <10 |

TABLE 3D

| Na Metasilicate | SODIUM CARBONATE (%) | | | | | | | |
|---|---|---|---|---|---|---|---|---|
| (%) | 0.00 | 0.20 | 0.25 | 0.50 | 1.00 | 2.00 | 5.00 | 10.00 |
| 0.00 | 730,000 | 740,000 | 680,000 | 550,000 | 120,000 | 16,000 | 28,000 | 30,000 |
| 0.20 | 630,000 | 400,000 | 190,000 | 26,000 | 8,000 | 2,200 | 25,000 | 28,000 |
| 0.40 | 350,000 | 12,000 | 2,000 | 120 | 410 | 2,800 | 34,000 | 31,000 |
| 0.60 | 8,600 | 180 | 170 | <10 | <10 | 110 | 3,800 | 20,000 |
| 0.80 | <10 | <10 | <10 | <10 | <10 | <10 | 4,400 | 16,000 |
| 1.00 | <10 | <10 | <10 | <10 | <10 | <10 | 1,100 | 4,200 |

TABLE 3E

| Na Metasilicate (%) | SODIUM CARBONATE (%) | | | | | | |
|---|---|---|---|---|---|---|---|
| | 0.00 | 0.25 | 0.50 | 1.00 | 2.00 | 5.00 | 10.00 |
| 0.00 | 1,100,000 | 870,000 | 840,000 | 160,000 | 13,000 | 6,200 | 6,300 |
| 0.20 | 910,000 | 430,000 | 35,000 | 7,700 | 2,600 | 10,000 | 10,000 |
| 0.40 | 590,000 | 18,000 | 870 | 260 | 1,300 | 2,900 | 6,800 |
| 0.60 | 160,000 | 60 | 20 | <10 | 80 | no data | 7,600 |
| 0.80 | 400 | <10 | <10 | <10 | 10 | 2,200 | 4,400 |
| 1.00 | <10 | <10 | <10 | <10 | <10 | 340 | 2,500 |

TABLE 3F

| Na Metasilicate | SODIUM CARBONATE (%) | | | | | | | |
|---|---|---|---|---|---|---|---|---|
| (%) | 0.00 | 0.25 | 0.50 | 0.75 | 1.00 | 2.00 | 5.00 | 10.00 |
| 0.00 | 820,000 | 940,000 | 580,000 | 300,000 | 110,000 | 9,000 | 6,700 | 6,400 |
| 0.20 | 970,000 | 600,000 | 56,000 | 15,000 | 2,400 | 1,800 | 6,600 | 4,700 |
| 0.40 | 860,000 | 20,000 | 1,400 | 150 | 680 | 1,200 | 3,200 | 4,800 |
| 0.60 | 270,000 | 1,500 | <10 | <10 | <10 | <10 | 4,200 | 3,500 |
| 0.80 | 24,000 | <10 | <10 | <10 | <10 | 550 | 4,600 | |
| 1.00 | 140 | <10 | <10 | <10 | <10 | <10 | 30 | 3,000 |

TABLE 3G

| Na Metasilicate (%) | NaCl (%) 0.00 | 20.00 | KCl (%) 20.00 | Avgard (%) 0.25 | 0.50 |
|---|---|---|---|---|---|
| 0.00 | 650,000 | 520,000 | 580,000 | 440,000 | 71,000 |
| 0.20 | 780,000 | 200,000 | 140,000 | 100,000 | 1,800 |
| 0.40 | 340,000 | 150,000 | 110,000 | 3,300 | 360 |
| 0.60 | 8,300 | 6,600 | 44,000 | 70 | 10 |
| 0.80 | 110 | 49,000 | 8,800 | <10 | <10 |
| 1.00 | <10 | 24,000 | 6,300 | <10 | <10 |

TABLE 3H

| Sodium Carbonate (%) | NaOH (%) 0.00 | 0.05 | 0.10 | 0.15 | 0.20 |
|---|---|---|---|---|---|
| 0.00 | 1,100,000 | 1,200,000 | 650,000 | 72,000 | 80 |
| 0.25 | 950,000 | 350,000 | 1,200 | <10 | <10 |
| 0.50 | 790,000 | 12,000 | <10 | <10 | <10 |
| 1.00 | 260,000 | 8,600 | <10 | <10 | <10 |
| 2.00 | 47,000 | 6,300 | 10 | <10 | <10 |
| 5.00 | 58,000 | 28,000 | 6,600 | 20 | <10 |
| 10.00 | 39,000 | 25,000 | 9,200 | 4,300 | 110 |

TABLE 3I

| Sodium Carbonate (%) | NaOH (%) 0 | 0.05 | 0.1 | 0.15 | 0.2 |
|---|---|---|---|---|---|
| 0 | 920,000 | 1,100,000 | 260,000 | 20,000 | 940 |
| 0.25 | 880,000 | 280,000 | 510 | <10 | <10 |
| 0.5 | 650,000 | 7,000 | 70 | <10 | <10 |
| 1 | 340,000 | 4,600 | 10 | <10 | <10 |
| 2 | 44,000 | 5,700 | 30 | <10 | <10 |
| 5 | 39,000 | 19,000 | 2,800 | 40 | <10 |
| 10 | 28,000 | 21,000 | 11,000 | 2,600 | 770 |

TABLE 3J

| Sodium Carbonate (%) | KOH (%) 0.00 | 0.10 | 0.20 | 0.30 |
|---|---|---|---|---|
| 0.00 | 940,000 | 970,000 | 58,000 | <10 |
| 0.25 | 930,000 | 75,000 | 40 | <10 |
| 0.50 | 880,000 | 1,800 | <10 | 30 |
| 1.00 | 280,000 | 1,700 | <10 | <10 |
| 2.00 | 40,000 | 6,400 | <10 | <10 |
| 5.00 | 45,000 | 18,000 | 150 | <10 |
| 10.00 | 35,000 | 25,000 | 7,500 | 700 |

TABLE 3K

| Sodium Carbonate (%) | KCl (%) 0.00 | 20.00 | NaCl (%) 20.00 |
|---|---|---|---|
| 0.00 | 930,000 | 1,000,000 | 980,000 |
| 0.25 | 870,000 | 300,000 | 650,000 |
| 0.50 | 1,200,000 | 220,000 | 400,000 |
| 1.00 | 120,000 | 140,000 | 310,000 |
| 2.00 | 44,000 | 100,000 | 180,000 |
| 5.00 | 39,000 | 39,000 | 88,000 |
| 10.00 | 18,000 | 7,200 | 41,000 |

TABLE 3L

| 1b8 NaOH (%) | KCl (%) 0.00 | 20.00 |
|---|---|---|
| 0.00 | 1,000,000 | 110,000 |
| 0.05 | 1,000,000 | 140,000 |
| 0.10 | 420,000 | 19,000 |
| 0.15 | 1,800 | 4,300 |
| 0.20 | 280 | 400 |

TABLE 3M

| 1b9 Avgard (%) | KCl (%) 0.00 | 20.00 |
|---|---|---|
| 0.00 | 590,000 | 610,000 |
| 0.25 | 470,000 | 160,000 |
| 0.50 | 65,000 | 33,000 |

EXAMPLE 4

The procedure of Example 3 was repeated, except that the aqueous treatment solutions used in Example 4 were made by dissolving the following components:

sodium metasilicate nonahydrate, sodium carbonate and NaOH (TABLES 4A, 4B)

sodium metasilicate nonahydrate, sodium carbonate and KCl (4C and 4D), sodium metasilicate nonahydrate, NaOH and KCl (TABLES 4E and 4F), sodium carbonate, NaOH and KCl (TABLES 4G and 4H), sodium metasilicate nonahydrate, sodium carbonate, NaOH and KCl (TABLES 4I and 4J), in the amounts set forth in the TABLES, in water. The weight percentages for the sodium metasilicate nonahydrate were calculated based on the total weight of sodium metasilicate nonahydrate, i.e., including the water of hydration. Results are given below TABLES 4A to 4J in cfu/ml. The baseline bacteria level for each test was determined by contacting 1 ml of the bacteria mixture to 99 ml of sterile water and is given in the 0.0%/0.0% data cell of each of the TABLES 4A to 4J.

TABLE 4A

All Below @ 0.05% NaOH

| Na Metasilicate (%) | SODIUM CARBONATE (%) | | | | | | | |
|---|---|---|---|---|---|---|---|---|
| | 0.00 | 0.25 | 0.50 | 0.75 | 1.00 | 2.00 | 5.00 | 10.00 |
| 0.00 | 1,100,000 | 68,000 | 5,100 | 2,800 | 1,300 | 800 | 5,700 | 14,000 |
| 0.20 | 520,000 | 2,300 | 470 | <10 | 20 | 1,200 | 3,600 | 10,000 |
| 0.40 | 12,000 | 30 | <10 | <10 | <10 | 20 | no data | 3,400 |
| 0.60 | 20 | <10 | <10 | <10 | <10 | <10 | 4,100 | 5,600 |
| 0.80 | <10 | <10 | <10 | <10 | <10 | <10 | 2,100 | 3,500 |
| 1.00 | <10 | <10 | <10 | <10 | <10 | <10 | 180 | 2,500 |

TABLE 4B

All Below @ 0.10% NaOH

| Na Metasilicate (%) | SODIUM CARBONATE (%) | | | | | | | |
|---|---|---|---|---|---|---|---|---|
| | 0.00 | 0.25 | 0.50 | 0.75 | 1.00 | 2.00 | 5.00 | 10.00 |
| 0.00 | 340,000 | 370 | <10 | 10 | <10 | 70 | 3,400 | 4,600 |
| 0.20 | 42,000 | <10 | <10 | <10 | <10 | <10 | 970 | 4,000 |
| 0.40 | <10 | <10 | <10 | <10 | <10 | <10 | <10 | 1,100 |
| 0.60 | <10 | <10 | <10 | <10 | <10 | <10 | <10 | 2,000 |
| 0.80 | <10 | <10 | <10 | <10 | <10 | <10 | <10 | 1,900 |
| 1.00 | <10 | <10 | <10 | <10 | <10 | <10 | <10 | 2,900 |

TABLE 4E

All Below @ 10.00% KCl

| Na Metasilicate (%) | NaOH (%) | | | | |
|---|---|---|---|---|---|
| | 0 | 0.05 | 0.1 | 0.15 | 0.2 |
| 0 | 820,000 | 2,800 | 1,100 | <10 | <10 |
| 0.2 | 120,000 | 9,200 | 1,000 | 540 | <10 |
| 0.4 | 19,000 | 1,800 | 30 | 30 | <10 |
| 0.6 | 270 | 350 | 160 | 30 | <10 |
| 0.8 | 50 | 160 | 10 | 30 | <10 |
| 1 | 30 | 10 | <10 | <10 | <10 |

TABLE 4C

All Below @ 10.00% KCl

| Na Metasilicate (%) | SODIUM CARBONATE (%) | | | | | | | |
|---|---|---|---|---|---|---|---|---|
| | 0.00 | 0.25 | 0.50 | 0.75 | 1.00 | 2.00 | 5.00 | 10.00 |
| 0.00 | 840,000 | 85,000 | 65,000 | 72,000 | 63,000 | 34,000 | 17,000 | 8,500 |
| 0.20 | 51,000 | 45,000 | 39,000 | 43,000 | 35,000 | 21,000 | 11,000 | 8,100 |
| 0.40 | 22,000 | 25,000 | 21,000 | 17,000 | 21,000 | 19,000 | 11,000 | 6,000 |
| 0.60 | 5,200 | 9,000 | 11,000 | 14,000 | 11,000 | 9,300 | 3,600 | 4,200 |
| 0.80 | 6,700 | 3,400 | 23,000 | 3,300 | 4,700 | 4,600 | 6,100 | 3,100 |
| 1.00 | 2,200 | 3,600 | 5,000 | 4,900 | 4,700 | 2,800 | 2,700 | 4,600 |

TABLE 4D

All Below @ 20.00% KCl

| Na Metasilicate (%) | SODIUM CARBONATE (%) | | | | | | | |
|---|---|---|---|---|---|---|---|---|
| | 0.00 | 0.25 | 0.50 | 0.75 | 1.00 | 2.00 | 5.00 | 10.00 |
| 0.00 | 910,000 | 150,000 | 80,000 | 60,000 | 48,000 | 29,000 | 14,000 | 8,200 |
| 0.20 | 29,000 | 26,000 | 20,000 | 22,000 | 22,000 | 19,000 | 9,100 | 10,000 |
| 0.40 | 8,000 | 16,000 | 5,400 | 14,000 | 9,100 | 11,000 | 12,000 | 3,700 |
| 0.60 | 5,700 | 11,000 | 4,200 | 12,000 | 9,000 | 8,600 | 9,300 | 2,400 |
| 0.80 | 4,100 | 23,000 | 5,100 | 10,000 | 5,600 | 2,900 | 2,300 | 2,500 |
| 1.00 | 1,700 | 16,000 | 3,500 | 10,000 | 3,800 | 2,900 | 3,000 | 2,800 |

TABLE 4F

All Below @ 20.00% KCl

| Na Metasilicate (%) | NaOH (%) | | | | |
|---|---|---|---|---|---|
| | 0 | 0.05 | 0.1 | 0.15 | 0.2 |
| 0 | 890,000 | 50,000 | 20,000 | 480 | 740 |
| 0.2 | 84,000 | 39,000 | 11,000 | 4,400 | 1,800 |
| 0.4 | 38,000 | 10,000 | 5,700 | 200 | 470 |
| 0.6 | 46,000 | 6,600 | 3,000 | 1,800 | 180 |
| 0.8 | 16,000 | 4,400 | 2,200 | 1,800 | 30 |
| 1 | 13,000 | 3,800 | 1,200 | 1,800 | 1,400 |

TABLE 4G

All Below @ 10.00% KCl

| Sodium Carbonate (%) | NaOH (%) | | | | |
|---|---|---|---|---|---|
| | 0 | 0.05 | 0.1 | 0.15 | 0.2 |
| 0 | 560,000 | 43,000 | 1,700 | <10 | 40 |
| 0.25 | 270,000 | 40,000 | 4,300 | 30 | 30 |
| 0.5 | 170,000 | 61,000 | 7,300 | 230 | 250 |
| 1 | 160,000 | 78,000 | 19,000 | 900 | 510 |
| 2 | 210,000 | 61,000 | 16,000 | 4,100 | 1,200 |
| 5 | 23,000 | 32,000 | 9,500 | 11,000 | 710 |
| 10 | 30,000 | 30,000 | 11,000 | 7,800 | 900 |

TABLE 4H

All Below @ 20.00% KCl

| Sodium Carbonate (%) | NaOH (%) | | | | |
|---|---|---|---|---|---|
| | 0 | 0.05 | 0.1 | 0.15 | 0.2 |
| 0 | 730,000 | 47,000 | 11,000 | 200 | 70 |
| 0.25 | 400,000 | 55,000 | 40,000 | 1,100 | 320 |
| 0.5 | 310,000 | 34,000 | 19,000 | 9,700 | 810 |
| 1 | 270,000 | 44,000 | 27,000 | 12,000 | 2,400 |
| 2 | 87,000 | no data | 13,000 | 12,000 | 2,600 |
| 5 | 28,000 | 52,000 | 23,000 | 9,500 | 2,600 |
| 10 | 30,000 | 23,000 | 11,000 | 11,000 | 2,900 |

TABLE 4I

All Below @ 0.10% NaOH and 10.0% KCl

| Na Metasilicate (%) | SODIUM CARBONATE (%) | | | | | | | |
|---|---|---|---|---|---|---|---|---|
| | 0.00 | 0.25 | 0.50 | 0.75 | 1.00 | 2.00 | 5.00 | 10.00 |
| 0.00 | 290 | 3,300 | 5,000 | 2,500 | 6,900 | 47,000 | 12,000 | 12,000 |
| 0.20 | 1,600 | 140 | 1,500 | 1,400 | 4,800 | 3,800 | 9,600 | 4,000 |
| 0.40 | no data | 290 | 1,900 | 540 | 1,700 | 4,300 | 3,500 | 5,300 |
| 0.60 | 190 | 1,200 | 1,800 | 270 | 760 | 2000 | 3,400 | 3,500 |
| 0.80 | 30 | 530 | 1,200 | 290 | 50 | 1,800 | 2,000 | 4,200 |
| 1.00 | 40 | <10 | 20 | 30 | 40 | 60 | 2,800 | 1,900 |

TABLE 4J

All Below @ 0.10% NaOH and 20.00% KCl

| Na Metasilicate (%) | SODIUM CARBONATE (%) | | | | | | | |
|---|---|---|---|---|---|---|---|---|
| | 0.00 | 0.25 | 0.50 | 0.75 | 1.00 | 2.00 | 5.00 | 10.00 |
| 0.00 | 12,000 | 12,000 | 11,000 | 14,000 | 17,000 | 22,000 | 11,000 | 12,000 |
| 0.20 | 5,100 | 7,500 | 11,000 | 11,000 | 11,000 | 9,500 | 8,200 | 7,500 |
| 0.40 | 3,400 | 2,300 | 3,800 | 3,300 | 1,100 | 4,700 | 6,300 | 2,700 |
| 0.60 | 1,400 | 2,900 | 3,400 | 1,900 | 1,200 | 5,400 | 2,800 | 1,300 |
| 0.80 | 2,700 | 200 | 1,100 | 700 | 1,200 | 400 | 1,700 | 700 |
| 1.00 | 2,700 | 600 | 900 | 600 | 500 | 800 | 900 | 2,400 |

EXAMPLE 5

Aqueous solutions were made by dissolving the components:

NaOH (TABLE 5A), sodium metasilicate nonahydrate and sodium carbonate (TABLE 5B) and sodium metasilicate nonahydrate and sodium carbonate/ NaOH (TABLE 5C) were in the amounts set forth in the respective TABLES, in water. The weight percentages for the sodium metasilicate nonahydrate were calculated based on the total weight of sodium metasilicate nonahydrate, i.e., including the water of hydration. The pH of each solution was measured. Results are set forth below in TABLES 5A to 5C.

TABLE 5A

| | NaOH (%) | | | | |
|---|---|---|---|---|---|
| | 0.00 | 0.05 | 0.10 | 0.15 | 0.20 |
| pH | 7.21 | 11.39 | 11.61 | 12.01 | 12.2 |

TABLE 5B

| Na Metasilicate (%) | All Below @ 0.10% NaOH | | | |
|---|---|---|---|---|
| | pH Sodium Carbonate (%) | | | |
| | 0.00 | 0.25 | 0.75 | 2.00 |
| 0.00 | 7.21 | 12.05 | 12.15 | 12.41 |
| 0.20 | 12.08 | 12.14 | 12.26 | 12.98 |
| 0.60 | 12.20 | 12.34 | 12.56 | 13.01 |

TABLE 5C

| Na Metasilicate (%) | pH Sodium Carbonate (%) | | | | |
|---|---|---|---|---|---|
| | 0.00 | 0.50 | 0.75 | 1.00 | 2.00 |
| 0.00 | 7.21 | 11.02 | 11.22 | 11.32 | 11.43 |
| 0.60 | 11.97 | 12.03 | 12.06 | 12.22 | 12.76 |
| 1.00 | 12.15 | 12.23 | 12.46 | 12.78 | 13.02 |

EXAMPLE 6

Aqueous treatment solutions were prepared, at concentrations of 4, 7, 10 and 13 wt %, from the following mixtures of dry ingredients:

Sodium metasilicate (Mixture A), 80 wt % sodium metasilicate and 20 wt % TSP (Mixture B), 30 wt % sodium metasilicate and 70 wt % sodium carbonate (Mixture C), 60 wt % sodium metasilicate and 40 wt % sodium-carbonate (Mixture D), 94 wt % sodium carbonate and 6 wt % sodium hydroxide (Mixture E), and 97 wt % sodium carbonate and 3 wt % sodium hydroxide (Mixture F), and in addition at concentrations of 1%, 2% and 3% for the sodium metasilicate (Mixture A). The pentahydrate form of sodium metasilicate was used to make the treatment solutions. The weight percentages for the sodium metasilicate pentahydrate were calculated based on the total weight of sodium metasilicate pentahydrate, i.e., including the water of hydration.

Chicken carcasses were taken from a commercial chicken processing line after having been eviscerated and washed with water, with carcasses for each set of tests being removed from the processing line over the course of 7 hours over several days.

Each carcass was submerged by hand in a 5 gallon container of test solution for 15 seconds, withdrawn from the test solution, allowed to drip for 30 seconds, placed in a plastic bag and rinsed. The carcasses were each rinsed by adding 400 milliliters of Butterfield's buffer (which had first been acidified with HCl to a pH of from about 2 to about 3, in order to allow neutralization of any residual alkalinity of the treated carcass) to the plastic bag containing the carcass and then shaking the carcass in bag of buffer solution for 1 minute. Samples of rinse solutions were then immediately removed from the bag and chilled by placing containers of the samples on water ice in shipping containers. The chilled samples of rinse solution were then shipped overnight on water ice, without being frozen themselves, to a lab for microbiological testing.

The tests were run in cycles, using one carcass per test, with each cycle beginning with a control sample and proceeding through the test solutions in order of increasing concentration of test solution and then returning to the control solution to begin the next cycle. Clean sterile rubber gloves were used for removing the chickens from the processing line and for the dipping procedure. The gloves were changed between carcasses.

*E. coli* counts were determined by subjecting rinse solution to *E. coli*/coliform count plate testing (Petrifilm™ (3M)) according to AOAC Official Method 991.14. Results are reported as the number of colonies per milliliter (CFU/mL).

*Salmonella* counts were determined by subjecting 55 gram samples of rinse solution, with three broth enrichment steps to colorimetric deoxyribonucleic acid hybridization testing (GENE-TRAK™ (Neogen Corporation)) according to AOAC Official Method 990.13. Presumptive positive results were, in general, confirmed according to FDA-BAM (8th Edition Revision A, 1998). Results are reported as the percentage of positive results, calculated as: ((number of positive results in the test series/total number of samples in the test series)×100).

In each case, an "Incident Rate" is reported as a percentage calculated according to: ((number of positive results in the test series/total number of samples in the test series)× 100). In the case of *E. Coli* results, an average value ("Ave.") is reported as the arithmetic average of the results for all days of the test series.

In TABLE 6A, for each set of results for a given test procedure, the results for days 1, 2, 3 and 4 are each based on a sample size of 25 carcasses. In TABLE 6B, for each set of results for a given test procedure, the results for day 1 are each based on a sample size of 11 carcasses, the results for days 2 and 3 are each based on a sample size of 17 carcasses, the results for days 4 and 5 are each based on a sample size of 20 carcasses and the result for day 6 is based on a sample size of 15 carcasses. In TABLES 6C–6H, for each set of results for a given test procedure, the results for days 1, 2, 3, 4 and 5 are each based on a sample size of 17 carcasses and the result for day 6 is based on a sample size of 15 carcasses.

Treatment with aqueous solutions of mixtures A–F did not, within the range of concentrations used, result in any substantial detriment to the visual appearance of the treated chicken carcasses.

TABLE 6A

| | Results for Mixture A (Sodium Metasilicate) | | | | | | | |
|---|---|---|---|---|---|---|---|---|
| | Control | | 10% TSP | | 1% Mixture A | | 2% Mixture A | |
| Day | E. coli | Salmonella | E. coli | Salmonella | E. coli | Salmonella | E. coli | Salmonella |
| 1 | <265 | 55% | <22 | 18% | <16 | 27% | <104 | 27% |
| 2 | <141 | 35% | <13 | 18% | <21 | 18% | <26 | 29% |

TABLE 6A-continued

Results for Mixture A (Sodium Metasilicate)

| | Control | | 10% TSP | | 1% Mixture A | | 2% Mixture A | |
|---|---|---|---|---|---|---|---|---|
| Day | E. coli | Salmonella | E. coli | Salmonella | E. coli | Salmonella | E. coli | Salmonella |
| 3 | <70 | 47% | <11 | 35% | <76 | 29% | <79 | 29% |
| 4 | <156 | 70% | <16 | 50% | <38 | 60% | <50 | 55% |
| 5 | <177 | 35% | <17 | 15% | <53 | 15% | <42 | 15% |
| 6 | <127 | 40% | <113 | 13% | <95 | 33% | <32 | 33% |
| Ave. | <156 | — | <32 | — | <50 | — | <56 | — |
| Incident rate | 97% | 47% | 54% | 25% | 75% | 30% | 62% | 31% |

TABLE 6B

Results for Mixture A (Sodium Metasilicate)

| | Control | | 10% TSP | | 3% Mixture A | | | Control | | 10% TSP | | 3% Mixture A | |
|---|---|---|---|---|---|---|---|---|---|---|---|---|---|
| Day | E. coli | Salmonella | E. coli | Salmonella | E. coli | Salmonella | Day | E. coli | Salmonella | E. coli | Salmonella | E. coli | Salmonella |
| 1 | <164 | 32% | <40 | 20% | <13 | 8% | Ave. | <135 | — | <111 | — | <26 | — |
| 2 | <148 | 52% | <32 | 16% | <34 | 24% | Incident rate | 94% | 38% | 62% | 16% | 58% | 15% |
| 3 | <115 | 12% | <343 | 4% | <20 | 12% | | | | | | | |
| 4 | <114 | 54% | <29 | 24% | <36 | 16% | | | | | | | |

TABLE 6C

Results for Mixture A (Sodium Metasilicate)

| | Control | | 10% TSP | | 4% Mixture A | | 7% Mixture A | | 10% Mixture A | | 13% Mixture A | |
|---|---|---|---|---|---|---|---|---|---|---|---|---|
| Day | E. coli | Salmonella | E. coli | Salmonella | E. coli | Salmonella | E. coli | Salmonella | E. coli | Salmonella | E. coli | Salmonella |
| 1 | <836 | 71% | <68 | 12% | <51 | 29% | <30 | 18% | <34 | 24% | <23 | 6% |
| 2 | 248 | 12% | <25 | 0% | <17 | 6% | <24 | 0% | <43 | 6% | <12 | 0% |
| 3 | <106 | 53% | <17 | 12% | <26 | 12% | <32 | 0% | <76 | 12% | <12 | 0% |
| 4 | 343 | 18% | <90 | 6% | <46 | 0% | <118 | 6% | <75 | 0% | <25 | 0% |
| 5 | 536 | 88% | <92 | 41% | <63 | 29% | <54 | 29% | <76 | 24% | <16 | 24% |
| 6 | 1307 | 20% | <27 | 0% | <45 | 0% | <19 | 7% | <13 | 0% | <11 | 0% |
| Ave. | <563 | — | <53 | — | <41 | — | <46 | — | <53 | — | <16 | — |
| Incident rate | 97% | 44% | 61% | 12% | 54% | 13% | 56% | 10% | 47% | 11% | 25% | 5% |

TABLE 6D

Results for Mixture B (80% Sodium Metasilicate/20% TSP)

| | Control | | 10% TSP | | 4% Mixture B | | 7% Mixture B | | 10% Mixture B | | 13% Mixture B | |
|---|---|---|---|---|---|---|---|---|---|---|---|---|
| Day | E. coli | Salmonella | E. coli | Salmonella | E. coli | Salmonella | E. coli | Salmonella | E. coli | Salmonella | E. coli | Salmonella |
| 1 | <88 | 24% | <39 | 6% | <16 | 6% | <88 | 0% | <15 | 0% | <11 | 0% |
| 2 | 228 | 65% | <25 | 35% | <73 | 29% | <18 | 41% | <32 | 18% | <17 | 18% |
| 3 | 279 | 76% | <24 | 18% | <22 | 18% | <31 | 24% | <12 | 29% | <10 | 12% |
| 4 | <401 | 82% | <54 | 59% | <26 | 41% | <42 | 47% | <42 | 47% | <16 | 24% |
| 5 | 110 | 76% | <58 | 53% | <16 | 24% | <48 | 47% | <903 | 35% | <14 | 18% |
| 6 | 74 | 53% | <16 | 13% | <23 | 13% | <11 | 13% | <23 | 20% | <10 | 7% |
| Ave. | <197 | — | <36 | — | <29 | — | <40 | — | <171 | — | <13 | — |
| Incident Rate | 97% | 63% | 56% | 31% | 49% | 22% | 53% | 29% | 50% | 25% | 29% | 13% |

TABLE 6E

Results for Mixture C (30% Sodium Metasilicate/70% Sodium Carbonate)

| | Control | | 10% TSP | | 4% Mixture C | | 7% Mixture C | | 10% Mixture C | | 13% Mixture C | |
|---|---|---|---|---|---|---|---|---|---|---|---|---|
| Day | E. coli | Salmonella | E. coli | Salmonella | E. coli | Salmonella | E. coli | Salmonella | E. coli | Salmonella | E. coli | Salmonella |
| 1 | <226 | 53% | <54 | 47% | <57 | 29% | <46 | 29% | <44 | 18% | <55 | 24% |
| 2 | <107 | 65% | <11 | 35% | <16 | 65% | <29 | 53% | <39 | 35% | <44 | 29% |
| 3 | <428 | 53% | <15 | 18% | <32 | 29% | <89 | 6% | <552 | 29% | <17 | 6% |
| 4 | 254 | 40% | <103 | 20% | <53 | 30% | <97 | 30% | <227 | 0% | 997 | 10% |
| 5 | 469 | 35% | <30 | 20% | <39 | 10% | <36 | 30% | <19 | 20% | <21 | 0% |
| 6 | <255 | 32% | <24 | 21% | <28 | 26% | <33 | 21% | <15 | 16% | <31 | 5% |
| Ave. | <208 | — | <29 | — | <29 | — | <44 | — | <134 | — | <126 | — |
| Incident Rate | 92% | 46% | 59% | 27% | 74% | 31% | 73% | 28% | 73% | 21% | 62% | 12% |

TABLE 6F

Results for Mixture D (60% Sodium Metasilicate/40% Sodium Carbonate)

| | Control | | 10% TSP | | 4% Mixture D | |
|---|---|---|---|---|---|---|
| Day | E. coli | Salmonella | E. coli | Salmonella | E. coli | Salmonella |
| 1 | <51 | 65% | <11 | 12% | <11 | 24% |
| 2 | <350 | 41% | <32 | 6% | <44 | 18% |
| 3 | <89 | 71% | <12 | 35% | <27 | 41% |
| 4 | <56 | 82% | <12 | 24% | <18 | 41% |
| 5 | 1,437 | 88% | <22 | 24% | <36 | 35% |
| 6 | <97 | 87% | <25 | 33% | <13 | 53% |
| Ave. | <122 | — | <19 | — | <25 | — |
| Incident Rate | 92% | 72% | 49% | 22% | 54% | 35% |

| | 7% Mixture D | | 10% Mixture D | | 13% Mixture D | |
|---|---|---|---|---|---|---|
| Day | E. coli | Salmonella | E. coli | Salmonella | E. coli | Salmonella |
| 1 | <94 | 35% | <14 | 35% | <11 | 29% |
| 2 | <130 | 29% | <28 | 6% | <20 | 0% |
| 3 | <26 | 47% | <13 | 35% | <18 | 18% |
| 4 | <21 | 35% | <11 | 65% | <23 | 29% |
| 5 | <19 | 24% | <25 | 29% | <11 | 0% |
| 6 | <47 | 40% | <12 | 47% | <11 | 53% |
| Ave. | <56 | — | <17 | — | <16 | — |
| Incident Rate | 64% | 35% | 39% | 36% | 30% | 22% |

TABLE 6G

Results for Mixture E (94% sodium carbonate/6% Sodium Hydroxide)

| | Control | | 10% TSP | | 4% Mixture E | |
|---|---|---|---|---|---|---|
| Day | E. coli | Salmonella | E. coli | Salmonella | E. coli | Salmonella |
| 1 | <79 | 35% | <28 | 15% | <15 | 35% |
| 2 | 109 | 64% | <11 | 36% | <76 | 50% |
| 3 | <286 | 29% | <362 | 29% | <44 | 35% |
| 4 | <99 | 41% | <18 | 0% | <32 | 18% |
| 5 | <74 | 24% | <11 | 0% | <40 | 6% |
| 6 | <25 | 20% | 117 | 33% | <41 | 53% |
| Ave. | <112 | — | <91 | — | <41 | — |
| Incident Rate | 85% | 36% | 56% | 19% | 74% | 33% |

TABLE 6G-continued

Results for Mixture E (94% sodium carbonate/6% Sodium Hydroxide)

| | 7% Mixture E | | 10% Mixture E | | 13% Mixture E | |
|---|---|---|---|---|---|---|
| Day | E. coli | Salmonella | E. coli | Salmonella | E. coli | Salmonella |
| 1 | <53 | 15% | <32 | 15% | <15 | 5% |
| 2 | <24 | 43% | <11 | 36% | <12 | 29% |
| 3 | <36 | 12% | <39 | 6% | <15 | 18% |
| 4 | <58 | 18% | <28 | 6% | <18 | 18% |
| 5 | <22 | 6% | <26 | 6% | <25 | 0% |
| 6 | <53 | 33% | <15 | 27% | <66 | 27% |
| Ave. | <41 | — | <25 | — | <25 | — |
| Incident Rate | 68% | 21% | 51% | 16% | 52% | 16% |

TABLE 6H

Results for Mixture F (97% Sodium Carbonate/3% Sodium Hydroxide)

| | Control | | 10% TSP | | 4% Mixture F | |
|---|---|---|---|---|---|---|
| Day | E. coli | Salmonella | E. coli | Salmonella | E. coli | Salmonella |
| 1 | 410 | 65% | <44 | 29% | <29 | 35% |
| 2 | 211 | 53% | <15 | 18% | <22 | 18% |
| 3 | <101 | 47% | <35 | 41% | <21 | 35% |
| 4 | <55 | 12% | <11 | 6% | <29 | 6% |
| 5 | 99 | 94% | <22 | 35% | <56 | 59% |
| 6 | <50 | 33% | <38 | 13% | <19 | 27% |
| Ave. | <141 | — | <28 | — | <29 | — |
| Incident Rate | 94% | 51% | 51% | 24% | 71% | 30% |

| | 7% Mixture F | | 10% Mixture F | | 13% Mixture F | |
|---|---|---|---|---|---|---|
| Day | E. coli | Salmonella | E. coli | Salmonella | E. coli | Salmonella |
| 1 | <39 | 35% | <18 | 35% | <21 | 41% |
| 2 | <80 | 18% | <33 | 18% | <16 | 6% |
| 3 | <27 | 47% | <14 | 24% | <13 | 18% |
| 4 | <19 | 12% | <17 | 12% | <12 | 12% |
| 5 | <28 | 53% | <21 | 53% | <19 | 29% |

TABLE 6H-continued

Results for Mixture F (97% Sodium Carbonate/3% Sodium Hydroxide)

| 6 | <17 | 20% | <35 | 40% | <13 | 0% |
|---|---|---|---|---|---|---|
| Ave. | <35 | — | <23 | — | <16 | — |
| Incident Rate | 71% | 31% | 56% | 30% | 48% | 18% |

The treatment method of the present invention allows simple and economical washing of animal carcasses to reduce bacterial contamination of the carcass and/or retard bacterial growth on the carcass, without substantial detriment to the organoleptic properties of the carcass and without generating a waste stream that contains a high amount of phosphates.

EXAMPLE 7

The method of the present invention was applied to vegetables. Aqueous treatment solutions were made with 2% w/w sodium metasilicate pentahydrate (pH=13.20) and 10% w/w sodium metasilicate pentahydrate (pH=13.71) in cold tap water. The weight percentages for the sodium metasilicate pentahydrate were calculated based on the total weight of sodium metasilicate pentahydrate, i.e., including the water of hydration. All wash solutions were allowed to mix for 15 minutes on a stir plate. Stainless steel trays (approximately 25×35×5 mm) were sanitized with 200 PPM sodium hypochlorite and rinsed to be used as treatment wash basins. The aqueous treatment solutions were then added to the sanitized trays.

Bolthouse carrots (obtained in 1 pound commercial packages) were separated into 140 gram samples. Each of the samples was washed in 2000 grams of one of the aqueous treatment solutions or of cold tap water by submerging the sample in the liquid for 10 minutes with occasional mixing. After 10 minutes each sample was rinsed under cold running tap water for 2 minutes in a sanitized stainless steel funnel. Rinsed carrots were allowed to drain for 10 minutes on perforated plastic weigh boats.

Contaminant organisms were enumerated by grinding samples of the treated carrots into Butterfield's phosphate buffer to make a 1:10 dilution.

This was then spread plate onto Standard Plate Count (SPC) agar. Plates were incubated aerobically for 48 hours at 30° C.

The remaining treated carrots were transferred into sterile Whirlpak bags and stored at 4° C. for 1 month. Each week a sample was taken and tested for the number of contaminants present.

The results of the microbiological testing are set forth in TABLE 7 as Colony Forming Units/gram of carrot (CFU/g)

TABLE 7

Contaminant Count for Treated Carrots (All counts are an average of two samplings)

| Sample Time | Control (CFU/g) | 2% Sodium Metasilicate (CFU/g) | 10% Sodium Metasilicate (CFU/g) |
|---|---|---|---|
| Initial - Day 0 | 36,000 | 2,200 | 400 |
| Week 1 | 1,600,000 | 120,000 | 52,000 |
| Week 2 | 9,700,000 | 14,000 | 1,100 |
| Week 3 | 15,000,000 | 18,000,000 | 1,800 |
| Week 4 | 12,000,000 | 100,000,000 | 1,000,000 |

After washing the two sodium metasilicate wash water basins contained an orange tinge apparently from removal of the outer layer of carrot. The 10% solution was a stronger color. The carrots from the 10% treatment were slightly soft or mushy on the outside, the 2% treatment were slightly softer than the water wash control, but did not appear objectionably softer.

At the end of 1 month the control water wash carrots had a pale white outer layer in spots, they appeared to have a dried out surface. The two samples of carrots from the sodium metasilicate wash still remained orange and appeared moist.

The treatment method of the present invention allows simple and economical washing of edible plant materials to reduce bacterial contamination of the edible plant materials and/or retard bacterial growth on the edible plant materials, without substantial detriment to the organoleptic properties of the edible plant materials and without generating a waste stream that contains a high amount of phosphates.

What is claimed is:

1. A method for treating an animal carcass to reduce bacterial contamination of the carcass or retard bacterial growth on the carcass, comprising contacting the carcass with an aqueous solution comprising one of (i) an alkali silicate and an alkali hydroxide, and (ii) an alkali silicate, an alkali hydroxide, and an alkali carbonate, said aqueous solution being present in an amount sufficient to reduce said contamination or to retard said growth.

2. The method of claim 1, wherein the alkali silicate comprises one or more crystalline or amorphous alkali silicate compounds according to the formula:

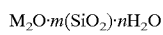

$M_2O \cdot m(SiO_2) \cdot nH_2O$ wherein:
M is sodium or potassium,
m is a number, wherein $0.5 \leq m \leq 3.5$, indicating the number of mole(s) of the $SiO_2$ moiety per 1 mole of $M_2O$ moiety; and
n indicates the water content, expressed as wt % water, wherein $0\% \leq n \leq 55\%$.

3. The method of claim 1, wherein the alkali silicate comprises one or more crystalline metasilicate according to $M_2O \cdot m(SiO_2) \cdot n'H_2O$, wherein M is Na or K and n' is 0, 5, 6, or 9 and indicates the number of moles of water per $SiO_2$ moiety.

4. The method of claim 1, wherein the alkali silicate comprises one or more of anhydrous sodium metasilicate, anhydrous potassium metasilicate, sodium metasilicate pentahydrate, sodium metasilicate hexahydrate and sodium metasilicate nonahydrate.

5. The method of claim 1, wherein the aqueous solution comprises greater than or equal to 0.05 percent by weight alkali silicate.

6. The method of claim 1, wherein the aqueous solution comprises from 1 to 15 percent by weight alkali silicate.

7. The method of claim 1, the aqueous solution further comprises an alkali carbonate.

8. The method of claim 7, wherein the aqueous solution comprises one or more alkali carbonate or alkali bicarbonate compounds according to the formula:

$$M'_{2-a}H_aCO_3 \cdot n'H_2O$$

wherein:

M' is sodium or potassium, a is 0 or 1, and n' is a number wherein $0 \leq n' \leq$ fully hydrated.

9. The method of claim 7, wherein the alkali carbonate is selected from sodium carbonate, potassium carbonate sodium bicarbonate and potassium bicarbonate, each of which may be in anhydrous or hydrated form, and mixtures thereof.

10. The method of claim 7, wherein the aqueous solution comprises greater than 0.05 percent by weight alkali silicate and greater than 0.05 percent by weight alkali carbonate.

11. The method of claim 7, wherein, the aqaeous solution comprises from from 0.5 to 10 percent by weight alkali silicate and from 0.2 to 15 percent by weight alkali carbonate.

12. The method of claim 7, wherein the aqueous solution comprises an alkali hydroxide according to formula:

$$M''OH$$

wherein:

M" is sodium or potassium.

13. The method of claim 7, wherein the aqueous solution comprises sodium hydroxide as the alkali hydroxide.

14. The method of claim 7, wherein the aqueous solution comprises greater than 0.5 percent by weight alkali silicate and greater than 0.05 percent by weight alkali hydroxide.

15. The method of claim 7, wherein the aqueous solution comprises from 0.5 to 10 percent by weight alkali silicate from 0.1 to 2 percent by weight alkali hydroxide.

16. The method of claim 7, wherein the aqueous solution comprises greater than or equal to 0.05 percent by weight alkali silcate, greater than or equal to 0.05 percent by weight alkali carbonate and greater than or equal to 0.05 percent by weight alkali hydroxide.

17. The method of claim 7, wherein the aqueous solution comprises from 0.5 to 10 percent by weight alkali silicate, from 0.2 to 15 percent by weight alkali carbonate and from 0.1 to 2 percent by weight alkali hydroxide.

18. The method of claim 1, wherein the animal carcass is contacted with the aqueous solution after slaughter of the animal and prior to, during or after chilling the carcass, by dipping the carcass in the treatment solution or by spraying the treatment solution on the carcass.

19. The method of claim 18, wherein the duration of the dipping or spraying is from about 1 second to about 5 minutes.

20. The method of claim 1, wherein the animal carcass is contacted with the aqueous solution by spraying the aqueous solution onto the carcass under a gage pressure of greater than 2 pounds per square inch.

21. The method of claim 1, wherein the animal carcass is contacted with the aqueous solution by spraying the aqueous solution onto the carcass under a gage pressure of 3 to 40 pounds per square inch.

22. The method of claim 1, wherein the aqueous solution is at a temperature of from 0 to about 85° C.

23. The method of claim 1, wherein the aqueous solution is at a temperature of from 0 to about 70° C.

24. The method of claim 1, wherein the aqueous solution is recovered after contacting the carcass and is recycled.

25. A method for treating an animal carcass to reduce bacterial contamination of the carcass or retard bacterial growth on the carcass, comprising contacting the animal carcass with a substantially ethanol free aqueous solution comprising one of (i) an alkali silicate and an alkali hydroxide, and (ii) an alkali silicate, an alkali hydroxide, and an alkali carbonate, said aqueous solution being present in an amount sufficient to reduce said contamination or to retard said growth.

26. The method of claim 25, wherein the aqueous solution comprises greater than or equal to 0.05 percent by weight alkali carbonate and greater than or equal to 0.05 percent by weight alkali hydroxide.

27. The method of claim 25, wherein the aqueous solution comprises from 0.1 percent by weight to saturation of alkali carbonate and from 0.5 to 5 percent by weight alkali hydroxide.

28. A method for treating edible plant materials to reduce bacterial contamination of edible plant materials or retad bacterial growth on the edible plant materials, comprising contacting the edible plant materials with an aqueous solution comprising one of (i) an alkali silicate and an alkali hydroxide, and (ii) an alkali silicate, an akali hydroxide, and an alkali carbonate, said aqueous solution being present in an amount sufficient to reduce said contamination or to retard said growth.

29. The method of claim 28, wherein the aqueous solution comprises greater than or equal to 0.05 percent by weight alkali silicate.

30. The method of claim 28, wherein the alkali silicate comprises one or more crystalline or amorphous alkali siliate compounds according to the formula:

$$M_2O \cdot m(SiO_2) \cdot nH_2O$$

wherein:

M is sodium or potassium, m is a number, wherein $0.5 \leq m \leq 3.5$, indicating the number of mole(s) of the $SiO_2$ moiety per 1 mole of $M_2O$ moiety; and n indicates the water content, expressed as wt % water, wherein $0\% \leq n \leq 55\%$.

* * * * *